US012769785B2

(12) United States Patent
Gong et al.

(10) Patent No.: US 12,769,785 B2
(45) Date of Patent: Oct. 20, 2026

(54) EDGE-BASED VIDEO CONTENT SEARCH WITH MULTIMODAL CONTENT UNDERSTANDING

(71) Applicant: Dell Products L.P., Round Rock, TX (US)

(72) Inventors: Min Gong, Shanghai (CN); Qicheng Qiu, Shanghai (CN); Zijia Wang, London (GB); Yumin Zhou, Shanghai (CN); Qi Bao, Acton, MA (US)

(73) Assignee: Dell Products L.P., Round Rock, TX (US)

( * ) Notice: Subject to any disclaimer, the term of this patent is extended or adjusted under 35 U.S.C. 154(b) by 238 days.

(21) Appl. No.: 18/672,273

(22) Filed: May 23, 2024

(65) Prior Publication Data

US 2025/0363170 A1 Nov. 27, 2025

(51) Int. Cl.
*G06F 16/732* (2019.01)
*G06V 20/40* (2022.01)

(52) U.S. Cl.
CPC .......... *G06F 16/7328* (2019.01); *G06V 20/46* (2022.01)

(58) Field of Classification Search
CPC ........ G06V 20/41; G06V 20/45; G06V 10/77; G06V 10/80; G06V 10/82; G06T 16/7328; G06T 16/783; G06T 16/7837; G06T 16/784; G06T 16/7844
See application file for complete search history.

(56) References Cited

U.S. PATENT DOCUMENTS

| | | | | |
|---|---|---|---|---|
| 9,917,869 | B2 * | 3/2018 | Hoffert | H04L 65/65 |
| 10,191,913 | B2 * | 1/2019 | Hoffert | G06F 16/24553 |
| 10,719,744 | B2 * | 7/2020 | Smith | G06V 30/274 |
| 11,068,757 | B2 * | 7/2021 | Strong | G06F 18/211 |
| 11,210,523 | B2 * | 12/2021 | Geng | G06F 18/29 |
| 11,397,462 | B2 * | 7/2022 | Eledath | G06F 3/011 |

(Continued)

FOREIGN PATENT DOCUMENTS

| | | | | |
|---|---|---|---|---|
| CN | 117251598 A | * 12/2023 | | G06F 16/7844 |
| EP | 3096243 A1 | * 11/2016 | | G06V 10/7788 |

OTHER PUBLICATIONS

J. Li et al., "BLIP: Bootstrapping Language-Image Pre-training for Unified Vision-Language Understanding and Generation," rearXiv:2201.12086v2, Feb. 15, 2022, 12 pages.

*Primary Examiner* — John Villecco
(74) *Attorney, Agent, or Firm* — Ryan, Mason & Lewis, LLP

(57) ABSTRACT

An apparatus in an illustrative embodiment comprises at least one processing device that includes at least a processor and a memory coupled to the processor. The at least one processing device is configured to receive a video signal in an edge computing site of an information processing system configured in accordance with a core-edge architecture, and to extract key frames from the received video signal. The at least one processing device is further configured, for each of at least a subset of the extracted key frames, to generate a multimodal embedding comprising one or more key frame vectors each characterizing one or more of image information, audio information and text information of the extracted key frame. The at least one processing 10 device is still further configured to process a search query based at least in part on the key frame vectors.

20 Claims, 7 Drawing Sheets

(56) References Cited

U.S. PATENT DOCUMENTS

| | | | | |
|---|---|---|---|---|
| 11,462,036 | B2 * | 10/2022 | Smith | G06V 30/274 |
| 11,899,671 | B1 * | 2/2024 | Mishra | G06F 16/182 |
| 12,026,164 | B1 * | 7/2024 | Mishra | G06F 16/182 |
| 12,073,602 | B2 * | 8/2024 | Liu | G06V 20/41 |
| 12,147,430 | B1 * | 11/2024 | Mishra | G06F 16/182 |
| 12,222,985 | B2 * | 2/2025 | Lee | G06F 16/783 |
| 12,444,194 | B2 * | 10/2025 | Gorti | G06V 20/41 |
| 12,561,332 | B2 * | 2/2026 | Mishra | G06F 16/182 |
| 2005/0267879 | A1 * | 12/2005 | Sekiguchi | G06F 16/78 |
| 2018/0260401 | A1 * | 9/2018 | Agrawal | G06F 16/71 |
| 2021/0209155 | A1 * | 7/2021 | Yang | G06F 16/7837 |
| 2021/0271707 | A1 * | 9/2021 | Lin | G06V 30/274 |
| 2022/0321970 | A1 * | 10/2022 | Swanson | G06V 20/46 |
| 2023/0214450 | A1 * | 7/2023 | Wang | G06V 20/46<br>382/155 |
| 2024/0355119 | A1 * | 10/2024 | Croitoru | G10L 15/04 |
| 2024/0404145 | A1 * | 12/2024 | Liu | G06V 10/82 |
| 2024/0404283 | A1 * | 12/2024 | Wang | G06V 10/776 |
| 2025/0077525 | A1 * | 3/2025 | Mishra | G06F 16/182 |
| 2025/0371596 | A1 * | 12/2025 | Adamek | G06F 16/901 |
| 2026/0011149 | A1 * | 1/2026 | Lakhotia | G06V 20/44 |

* cited by examiner

EDGE-BASED VIDEO CONTENT SEARCH WITH MULTIMODAL CONTENT UNDERSTANDING

FIELD

The field relates generally to information processing, and more particularly relates to video signal processing.

BACKGROUND

Information processing systems are often configured in accordance with a core-edge architecture. Such a system may include, for example, one or more core computing sites that are implemented in at least one cloud, and one or more edge computing sites deployed closer to certain end users of the system. The one or more edge computing sites communicate with the one or more core computing sites over one or more networks. In some systems of this type, video signals may be sent from video cameras or other devices to one or more of the edge computing sites. In these and numerous other arrangements, a need exists for enhanced processing capabilities for video signals received at edge computing sites.

SUMMARY

Illustrative embodiments of the present disclosure provide techniques for edge-based video content search with multimodal content understanding. The video content search techniques are illustratively implemented in an information processing system comprising distributed core and edge computing sites having respective sets of resources, such as compute, storage and network resources.

Advantageously, the disclosed techniques in some embodiments achieve highly accurate and efficient video content searching that can be performed substantially in real-time and primarily or entirely at the edge, as video signals are received in an edge computing site from video cameras or other video sources.

In one embodiment, an apparatus comprises at least one processing device, with the at least one processing device comprising a processor and a memory coupled to the processor. The at least one processing device is configured to receive a video signal in an edge computing site of an information processing system configured in accordance with a core-edge architecture, and to extract key frames from the received video signal. The at least one processing device is further configured, for each of at least a subset of the extracted key frames, to generate a multimodal embedding comprising one or more key frame vectors each characterizing one or more of image information, audio information and text information of the extracted key frame. The at least one processing device is still further configured to process a search query based at least in part on the key frame vectors.

In some embodiments, the receiving of the video signal, the extracting of the key frames from the received video signal, and the generating of the multimodal embeddings for respective ones of the extracted key frames are performed by the at least one processing device in the edge computing site in real-time or near-real-time as the video signal is received in the edge computing site.

The edge computing site illustratively comprises one or more edge computing devices including the at least one processing device.

In some embodiments, the edge computing site comprises a video ingestion interface configured for receiving the video signal and a video search interface configured to support video content search for the received video signal.

Additionally or alternatively, the edge computing site in some embodiments comprises streaming storage coupled to the video ingestion interface and configured to store raw video data of the received video signal.

The video signal in some embodiments is received in the edge computing site from one or more video cameras that communicate with the edge computing site over at least one network. Additional or alternative video sources can supply video signals to the edge computing site in other embodiments.

The information processing system configured in accordance with the core-edge architecture further comprises one or more core computing sites each comprising one or more core computing devices at least a portion of which are implemented at least in part utilizing cloud infrastructure. A wide variety of other types and arrangements of edge computing sites and core computing sites can be used in other embodiments, and the term "core-edge architecture" as used herein is therefore intended to be broadly construed.

In some embodiments, the multimodal embedding provides a joint embedding into a shared vector space in which key frame vectors characterizing image information, audio information and text information having similar content are close to one another in the shared vector space.

In some embodiments, processing the search query based at least in part on the key frame vectors comprises generating an embedding for query text of the search query, performing a key frame search in a key frame vector database utilizing the query text embedding to identify at least one key frame, retrieving a plurality of adjacent frames relative to the at least one key frame, and performing a fine-grained frame search utilizing the at least one key frame and the plurality of adjacent frames.

Performing the fine-grained frame search in some embodiments further comprises generating multimodal embeddings for respective ones of the plurality of adjacent frames, comparing the multimodal embeddings generated for the respective ones of the adjacent frames to the query text embedding, and identifying at least one frame based at least in part on a result of the comparing.

One or more frames identified in the fine-grained frame search are illustratively returned as a search result responsive to the search query.

Other illustrative embodiments include, by way of example and without limitation, methods and computer program products comprising non-transitory processor-readable storage media.

The foregoing arrangements are presented by way of illustrative example only, and should not be construed as limiting the scope of the present disclosure in any way.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, a wide variety of different arrangements of core-edge architectures comprising different types of core and edge infrastructure components. Numerous different types of enterprise computing and storage systems are also encompassed by the term "information processing system" as that term is broadly used herein.

Figure 1:
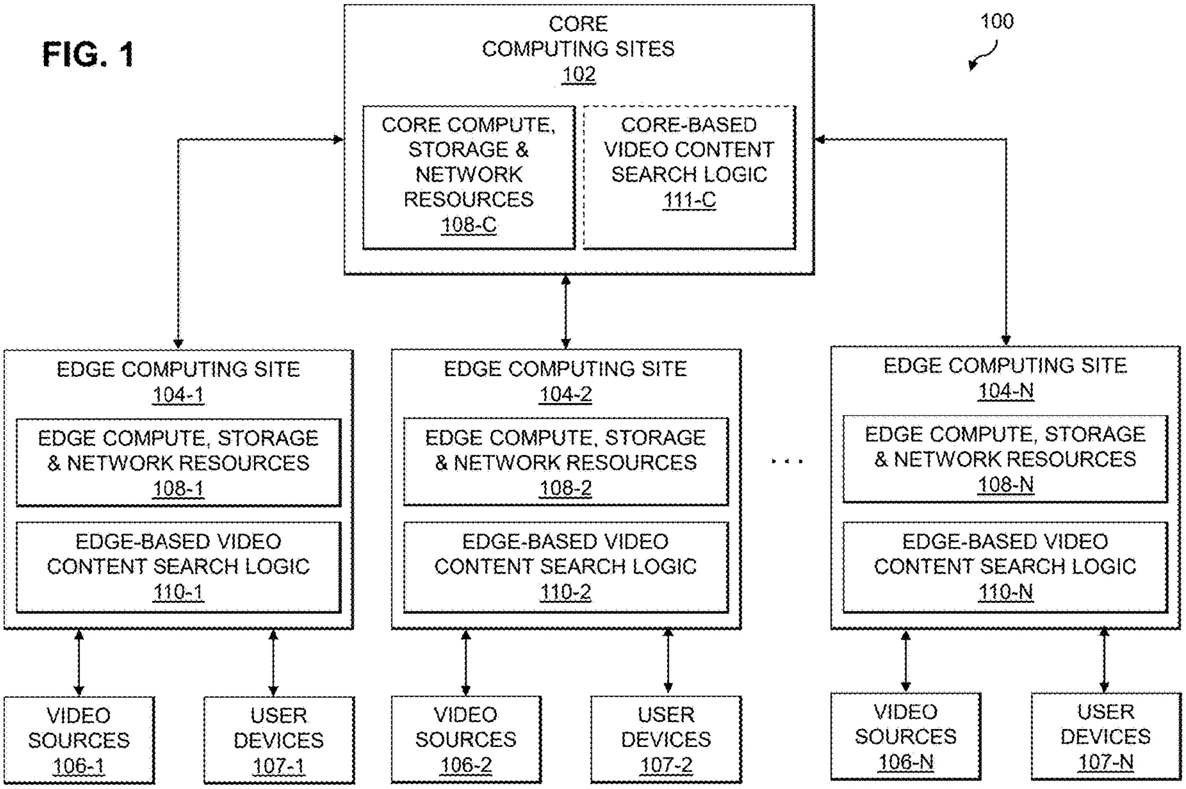
FIG. 1 is a block diagram of an information processing system configured for edge-based video content search in an illustrative embodiment.

FIG. 1 shows an information processing system 100 configured with functionality for edge-based video content search in an illustrative embodiment. The information processing system 100 comprises one or more core computing sites 102 coupled to a plurality of edge computing sites 104-1, 104-2, . . . 104-N, collectively referred to as edge computing sites 104. Each of the edge computing sites 104 illustratively has multiple video sources 106 and multiple user devices 107 associated therewith. More particularly, edge computing site 104-1 has video sources 106-1 and user devices 107-1 coupled thereto, edge computing site 104-2 has video sources 106-2 and user devices 107-2 coupled thereto, and edge computing site 104-N has video sources 106-N and user devices 107-N coupled thereto, as shown. It should be noted that the value N is an arbitrary integer, where N is greater than or equal to one. Also, different numbers of video sources 106 and user devices 107 may be coupled to each of the edge computing sites 104.

Also, although each of the video sources 106 and user devices 107 is illustrated in the figure as being coupled to a particular one of the edge computing sites 104, this is by way of example only, and a given one of the video sources 106 or user devices 107 may be coupled to multiple ones of the edge computing sites 104 at the same time, or to different ones of the edge computing sites 104 at different times. Additionally or alternatively, one or more of the video sources 106 or user devices 107 in some embodiments may be coupled to at least one of the one or more core computing sites 102.

The one or more core computing sites 102 may each comprise one or more data centers or other types and arrangements of core nodes. The edge computing sites 104 may each comprise one or more edge stations or other types and arrangements of edge nodes. Each such node or other computing site comprises at least one processing device that includes a processor coupled to a memory.

The video sources 106 in some embodiments comprise video cameras that communicate with their corresponding edge computing sites 104 over at least one network. A wide variety of other video sources can be used. Also, a video source in some embodiments may comprise a part of a larger device or other system. For example, one or more of the user devices 107 may each comprise one or more video sources. As another example, a video source can comprise one or more user devices. The term "video source" as used herein is therefore intended to be broadly construed. Description below regarding the user devices 107 therefore also applies to certain implementations of the video sources 106.

The user devices 107 are illustratively implemented as respective computers or other types and arrangements of processing devices. Such processing devices can include, for example, desktop computers, laptop computers, tablet computers, mobile telephones, Internet of Things (IoT) devices, or other types of processing devices, as well as combinations of multiple such devices. One or more of the user devices 107 can additionally or alternatively comprise virtualized computing resources, such as virtual machines (VMs), containers, etc. Although the user devices 107 are shown in the figure as being separate from the edge computing sites 104, this is by way of illustrative example only, and in other embodiments one or more of the user devices 107 may be considered part of their corresponding edge computing sites 104 and may in some embodiments comprise a portion of the edge resources of those corresponding edge computing sites 104. The user devices 107 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

The system 100 comprising the one or more core computing sites 102, the edge computing sites 104, the video sources 106 and the user devices 107 is an example of what is more generally referred to herein as an "information processing system." Other examples of information processing systems are described elsewhere herein, and the term is intended to be broadly construed to encompass, for example, various arrangements of one or more processing devices, with each such processing device comprising at least one processor and at least one memory coupled to the at least one processor.

The one or more core computing sites 102 illustratively comprise at least one data center implemented at least in part utilizing cloud infrastructure. Each of the edge computing sites 104 illustratively comprises a plurality of edge devices and implements at least a portion of edge-based video content search functionality for one or more of the users of the information processing system 100.

The term "user" herein is intended to be broadly construed so as to encompass numerous arrangements of human, hardware, software or firmware entities, as well as combinations of such entities.

Compute, storage and/or network services may be provided for users in some embodiments under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other arrangements could be used.

Although not explicitly shown in FIG. 1, one or more networks are assumed to be deployed in system 100 to interconnect the one or more core computing sites 102, the edge computing sites 104, the video sources 106 and the user devices 107. Such networks can comprise, for example, a portion of a global computer network such as the Internet, a wide area network (WAN), a local area network (LAN), a satellite network, a telephone or cable network, a cellular network such as 4G or 5G network, a wireless network such as a WiFi or WiMAX network, or various portions or combinations of these and other types of networks. The system 100 in some embodiments therefore comprises combinations of multiple different types of networks. Such networks can support inter-device communications utilizing Internet Protocol (IP) and/or a wide variety of other communication protocols. In some embodiments, a first type of network (e.g., a wireless LAN) couples the video sources 106 and the user devices 107 to the edge computing sites 104, while a second type of network (e.g., a virtual private network (VPN)) couples the edge computing sites 104 to the one or more core computing sites 102, although numerous other arrangements can be used.

The one or more core computing sites 102 and the edge computing sites 104 illustratively execute at least portions of various workloads for system users. Such workloads may comprise one or more applications. As used herein, the term "application" is intended to be broadly construed to encompass, for example, microservices and other types of services implemented in software executed by the one or more core computing sites 102 or the edge computing sites 104. Such applications can include core-hosted applications running on the one or more core computing sites 102 and edge-hosted applications running on the edge computing sites 104.

In system 100, the edge computing sites 104 comprise respective sets of edge compute, storage and network resources 108-1, 108-2, . . . 108-N. A given such set of edge resources illustratively comprises at least one of compute, storage and network resources of one or more edge devices of the corresponding edge computing site. The edge computing sites 104 further comprise respective instances of edge-based video content search logic 110-1, 110-2, . . . 110-N. Similarly, the one or more core computing sites 102 comprise one or more sets of core compute, storage and network resources 108-C and one or more instances of core-based video content search logic 111-C. The core-based video content search logic 111-C is shown in dashed outline, as it may be eliminated, for example, in embodiments that implement edge-based video content search entirely in the edge computing sites 104, without any part of that functionality being provided by the core-based video content search logic 111-C.

Edge compute resources of the edge computing sites 104 can include, for example, various arrangements of processors, possibly including associated accelerators, as described in more detail elsewhere herein.

Edge storage resources of the edge computing sites 104 can include, for example, one or more storage systems or portions thereof that are part of or otherwise associated with the edge computing sites 104. A given such storage system may comprise, for example, all-flash and hybrid flash storage arrays, software-defined storage systems, cloud storage systems, object-based storage system, and scale-out distributed storage clusters. Combinations of multiple ones of these and other storage types can also be used in implementing a given storage system in an illustrative embodiment.

Edge network resources of the edge computing sites 104 can include, for example, resources of various types of network interface devices providing particular bandwidth, data rate and communication protocol features.

One or more of the edge computing sites 104 each comprise a plurality of edge devices, with a given such edge device comprising a processing device that includes a processor coupled to a memory.

The one or more core computing sites 102 of the system 100 may comprise, for example, at least one data center implemented at least in part utilizing cloud infrastructure. It is to be appreciated, however, that illustrative embodiments disclosed herein do not require the use of cloud infrastructure.

Each of the instances of edge-based video content search logic 110 is illustratively configured to implement at least portions of functionality for edge-based video content search within its corresponding one of the edge computing sites 104 in system 100, as will now be described in more detail.

It should be noted that such functionality in some embodiments may also involve utilization of core-based video content search logic 111-C. For example, a video content search in some embodiments can be performed using some resources of the one or more core computing sites 102, under the control of the core-based video content search logic 111-C, but is assumed in illustrative embodiments to be implemented completely or primarily at the edge computing sites 104 using their respective instances of edge-based video content search logic 110.

Accordingly, in some embodiments, at least one processing device of the system 100, which illustratively includes at least one edge computing device or other processing device of at least one of the edge computing sites 104, is configured to receive a video signal from one of the video sources 106, and to extract key frames from the received video signal. The at least one processing device is further configured, for each of at least a subset of the extracted key frames, to generate a multimodal embedding comprising one or more key frame vectors each characterizing one or more of image information, audio information and text information of the extracted key frame. The at least one processing device is still further configured to process a search query based at least in part on the key frame vectors.

In some embodiments, the receiving of the video signal, the extracting of the key frames from the received video signal, and the generating of the multimodal embeddings for respective ones of the extracted key frames are performed by the at least one processing device in a given one of the edge computing sites 104 in real-time or near-real-time as the video signal is received in the given edge computing site. Such operations illustratively comprise an algorithm implemented by or under the control of an instance of the edge-based video content search logic 110 within the given edge computing site.

It will be assumed for purposes of illustrative description below that the given edge computing site in these embodiments comprises the edge computing site 104-1 that includes edge-based video content search logic 110-1, although it is to be appreciated that the other edge computing sites 104 and their respective instances of edge-based video content search logic 110 are assumed to be configured to operate in a manner similar to that described below for the edge computing site 104-1. The functionality to be described is therefore illustratively performed by at least one edge computing device or other processing device of the edge computing site 104-1. In other embodiments, the edge computing site 104-1 can interact with the one or more core computing sites 102 and/or one or more of the other edge computing sites 104 in implementing edge-based video content search as disclosed herein.

Accordingly, the term "edge-based video content search" as used herein is intended to be broadly construed, so as to encompass a wide variety of different arrangements in which the disclosed functionality is implemented at least in part in one or more edge computing sites, possibly with involvement of at least one core computing site.

Also, it should be noted that the system 100 comprising the one or more core computing sites 102 and the edge computing sites 104 is just one example of an information processing system configured in accordance with a core-edge architecture. It is to be appreciated that a wide variety of other types and arrangements of edge computing sites and core computing sites can be used in other embodiments, and the term "core-edge architecture" as used herein is therefore intended to be broadly construed.

As mentioned previously, in some embodiments, the one or more core computing sites 102 are implemented using cloud infrastructure. Cloud computing provides a number of advantages, including but not limited to playing a significant role in making optimal decisions while offering the benefits of scalability and reduced cost. Edge computing implemented using the edge computing sites 104 provides another option, typically offering faster response time and increased data security relative to cloud computing. Rather than constantly delivering data back to the one or more core computing sites 102, which may be implemented as or within a cloud data center, edge computing enables devices running at the edge computing sites 104 to gather and process data in real-time, allowing them to respond faster and more effectively. The edge computing sites 104 in some embodiments interact with the one or more core computing sites 102 implemented as or within a software-defined data center (SDDC), a virtual data center (VDC), or other similar dynamically-configurable arrangement, where real-time adjustment thereof based on workload demand at edge computing sites 104 is desired.

As indicated above, the edge computing site 104-1 illustratively comprises one or more edge computing devices including the at least one processing device.

In some embodiments, the edge computing site 104-1 comprises a video ingestion interface configured for receiving the video signal and a video search interface configured to support video content search for the received video signal.

Additionally or alternatively, the edge computing site 104-1 in some embodiments comprises streaming storage coupled to the video ingestion interface and configured to store raw video data of the received video signal.

As mentioned previously, the video signal in some embodiments is received in the edge computing site 104-1 from one or more video cameras or other video sources 106-1 that communicate with the edge computing site 104-1 over at least one network. Additional or alternative video sources can supply video signals to the edge computing site 104-1 in other embodiments. For example, additional or alternative video sources may be associated with one or more of the user devices 107-1.

In some embodiments, the above-noted multimodal embedding provides a joint embedding into a shared vector space in which key frame vectors characterizing image information, audio information and text information having similar content are close to one another in the shared vector space.

The multimodal embedding in some embodiments involves generating separate key frame vectors for each of a plurality of different content modalities of the video signal. This may involve, for example, generating the multimodal embedding for a given one of the extracted key frames as a first keyframe vector characterizing image information of the given extracted keyframe, a second keyframe vector characterizing audio information of the given extracted keyframe, and a third keyframe vector characterizing text information of the given extracted keyframe. Such key frame vectors in some embodiments may be further processed so as to generate, for example, a single key frame vector for the given extracted keyframe of the video signal. This further processing can involve, for example, averaging or otherwise combining the multiple separate key frame vectors generated for the different content modalities of the video signal. Numerous other key frame vector generation techniques can be used.

The key frame vectors generated for multiple extracted key frames of the received video signal under the control of the edge-based video content search logic 110-1 are illustratively stored in a key frame vector database of the edge computing site 104-1, although other database configurations can be used in other embodiments.

In some embodiments, processing the search query based at least in part on the key frame vectors comprises generating an embedding for query text of the search query, performing a key frame search in the key frame vector database utilizing the query text embedding to identify at least one key frame, retrieving a plurality of adjacent frames relative to the at least one key frame, and performing a fine-grained frame search utilizing the at least one key frame and the plurality of adjacent frames.

Performing the fine-grained frame search in some embodiments further comprises generating multimodal embeddings for respective ones of the plurality of adjacent frames, comparing the multimodal embeddings generated for the respective ones of the adjacent frames to the query text embedding, and identifying at least one frame based at least in part on a result of the comparing.

One or more frames identified in the fine-grained frame search are illustratively returned as a search result responsive to the search query.

Additionally or alternatively, in some embodiments processing the search query based at least in part on the key frame vectors comprises comparing an embedding generated for query text of the search query to at least a first key frame vector of a first key frame and one or more additional key frame vectors generated for respective ones of a plurality of adjacent frames of the first key frame.

The above-described functionality in some embodiments represents an example algorithm performed by the edge-based video content search logic 110-1 of the edge computing site 104-1, possibly with involvement of additional instances of edge-based video content search logic 110 in one or more other ones of the edge computing sites 104 and/or core-based video content search logic 111-C in the one or more core computing sites 102. The algorithm is illustratively implemented utilizing processor and memory components of at least one processing platform that includes the at least one processing device. For example, at least portions of the edge-based video content search logic 110 may be implemented at least in part in the form of software that is stored in memory and executed by a processor.

These and other features and functionality of the system 100 are illustratively implemented at least in part by or under the control of at least a subset of the instances of edge-based video content search logic 110. The at least one processing device referred to above and elsewhere herein illustratively comprises one or more processing devices that implement respective instances of the edge-based video content search logic 110.

Although shown as an element of the edge computing sites 104 in this embodiment, the edge-based video content search logic 110 in other embodiments can be implemented at least in part externally to the edge computing sites 104, for example, utilizing a stand-alone server, set of servers or other type of external system coupled via one or more networks to the edge computing sites 104. In some embodiments, the edge-based video content search logic 110 may be implemented at least in part within one or more of the video sources 106, user devices 107 and/or in other system components.

The one or more core computing sites 102 and the edge computing sites 104 in the FIG. 1 embodiment are each assumed to be implemented using at least one processing device of at least one processing platform. Each such processing device generally comprises at least one processor and an associated memory, and implements at least a portion of the functionality of the edge-based video content search logic 110.

It is to be appreciated that the particular arrangement of the one or more core computing sites 102, the edge computing sites 104, the video sources 106, the user devices 107, the core and edge compute, storage and network resources 108 and the edge-based video content search logic 110 illustrated in the FIG. 1 embodiment is presented by way of example only, and alternative arrangements can be used in other embodiments. As discussed above, for example, the edge-based video content search logic 110 may be implemented at least in part external to the edge computing sites 104.

It is also to be understood that the particular set of elements shown in FIG. 1 for edge-based video content search in respective ones of the edge computing sites 104 utilizing edge-based video content search logic 110 is presented by way of illustrative example only, and in other embodiments additional or alternative elements may be used. Thus, another embodiment may include additional or alternative systems, devices and other entities, as well as different arrangements of modules and other components.

The one or more core computing sites 102, and possibly other portions of the system 100, may be implemented at least in part in cloud infrastructure.

The one or more core computing sites 102, the edge computing sites 104, the video sources 106, the user devices 107 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The one or more core computing sites 102, the edge computing sites 104, the video sources 106 and the user devices 107, or components thereof, may be implemented on respective distinct processing platforms, although numerous other arrangements are possible. For example, in some embodiments, at least portions of the video sources 106, the user devices 107 and the edge computing sites 104 are implemented on the same processing platform. One or more of the video sources 106 and/or the user devices 107 can therefore be implemented at least in part within at least one processing platform that implements at least a portion of the edge computing sites 104 and/or the one or more core computing sites 102. Accordingly, in some embodiments, at least a portion of the video sources 106 and/or the user devices 107 can be coupled to the one or more core computing sites 102, in addition to or in place of being coupled to at least one of the edge computing sites 104.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the one or more core computing sites 102, the edge computing sites 104, the video sources 106 and the user devices 107, or portions or components thereof, to reside in different data centers or other different geographic locations. Numerous other distributed implementations are possible.

Additional examples of processing platforms utilized to implement the one or more core computing sites 102, the edge computing sites 104, the video sources 106, the user devices 107, and possibly additional or alternative components of the system 100 in illustrative embodiments will be described in more detail below in conjunction with FIGS. 6 and 7.

It is to be appreciated that these and other features of illustrative embodiments are presented by way of example only, and should not be construed as limiting in any way.

An exemplary process for edge-based video content search will now be described in more detail with reference to the flow diagram of FIG. 2. It is to be understood that this particular process is only an example, and that additional or alternative processes for edge-based video content search may be used in other embodiments.

In this embodiment, the process includes steps 200 through 206. These steps are assumed to be performed by a given one of the edge computing sites 104 utilizing its corresponding instance of edge-based video content search logic 110, although it is to be appreciated that other arrangements of system components can implement this or other similar processes in other embodiments. In some embodiments, the FIG. 2 process more particularly represents an example algorithm performed at least in part by one or more instances of edge-based video content search logic 110 in system 100.

In step 200, a real-time video signal is received in a given edge computing site from one or more video cameras. A given such video camera is an example of what is more generally referred to herein as a "video source." The edge computing site comprises at least one edge computing device or other processing device comprising a processor and a memory, with the processor being coupled to the memory. The real-time video signal is illustratively received substantially as it is generated by the given video camera.

In step 202, key frames are identified in the received video signal and extracted from the received video signal. This processing also illustratively occurs substantially in real time as the video signal is received. The received video signal in some embodiments is stored in streaming storage of the edge computing site.

In step 204, for each of at least a subset of the extracted key frames, a multimodal embedding is generated. Again, this processing also illustratively occurs substantially in real time as the video signal is received and the key frames are identified and extracted. The multimodal embedding generated for a given extracted key frame illustratively comprises one or more key frame vectors charactering image information, audio information and text information of the given extracted key frame, although other types and arrangements of multimodal embeddings can be used. The resulting key frame vectors are illustratively stored in a key frame vector database in order to support real-time content search via search queries received from one or more system users.

In step 206, a search query received from a given system user is processed based at least in part on the key frame vectors. For example, the processing of the search query based at least in part on the key frame vectors in some embodiments comprises comparing an embedding generated for query text of the search query to at least a first key frame vector of a first key frame and one or more additional key frame vectors generated for respective ones of a plurality of adjacent frames of the first key frame. Other types of search query processing based at least in part on the key frame vectors can be performed in other embodiments. The search query may be received, for example, from a user device in communication with the edge computing site. In other embodiments, search queries may be received from one or more core computing sites and/or other edge computing sites.

Additional aspects of the edge-based video content search illustrated by the FIG. 2 process will be described in more detail below with reference to the illustrative embodiments of FIGS. 3 through 5.

Figure 2:
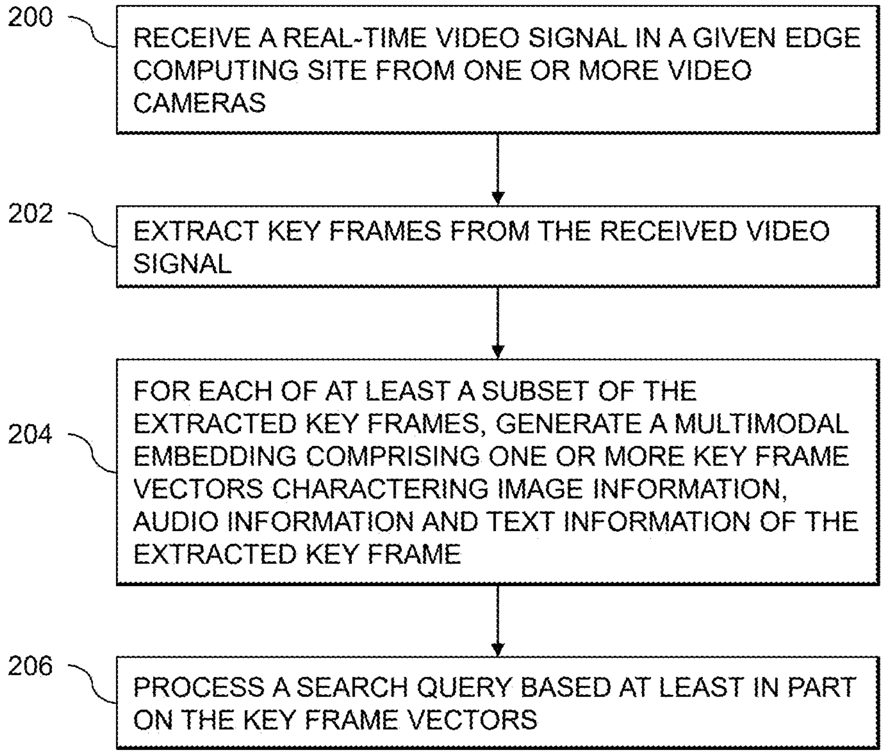
FIG. 2 is a flow diagram of an example process for edge-based video content search in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving edge computing sites and functionality for edge-based video content search. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different edge-based video content search arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments will now be described with reference to FIGS. 3 through 5.

Figure 3:
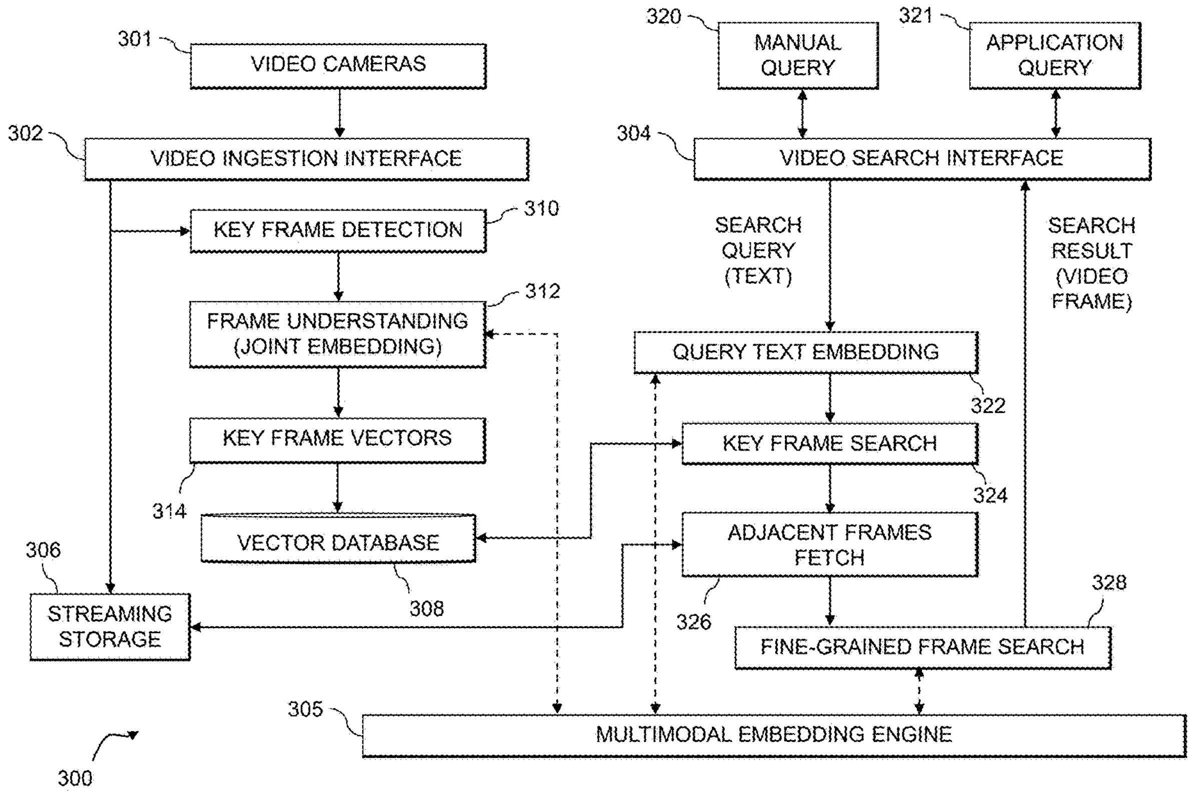
FIG. 3 is a schematic diagram showing an example of edge-based video content search in an illustrative embodiment.

Referring initially to FIG. 3, a more detailed example of edge-based video content search in an illustrative embodiment is shown. In this embodiment, an information processing system 300 comprises one or more video cameras 301 and an edge computing site, with the edge computing site illustratively including a video ingestion interface 302 configured for receiving at least one video signal from the one or more video cameras 301 and a video search interface 304 configured to support video content search for the received video signal. The edge computing site further in this embodiment further comprises a multimodal embedding engine 305, streaming storage 306 and a key frame vector database 308. The streaming storage 306 is illustratively coupled to the video ingestion interface 302 and is configured to store raw video data of the received video signal.

In operation, the received video signal is processed in key frame detection block 310 to identify and extract key frames therefrom. The extracted key frames are processed in frame understanding block 312 to generate a joint embedding comprising one or more key frame vectors for each extracted key frame, using the multimodal embedding engine 305 and taking into account multiple distinct content modalities of the extracted key frames. Such a joint embedding provides "multimodal understanding" of the extracted key frames, as that term is broadly used herein. The resulting key frame vectors 314 for multiple extracted key frames of the received video signal are stored in the key frame vector database 308.

The multimodal embedding engine 305 in some embodiments can be configured at least in part to process application programming interface (API) calls, with the input of a given such API call comprising an image or text derived from an extracted key frame, and the output comprising corresponding high-dimensional key frame vectors. The multimodal embedding engine in some embodiments implements one or more multimodal embedding techniques such as Contrastive Language-Image Pretraining (CLIP), Bootstrapping Language-Image Pre-training (BLIP), GPT4-V and/or other multimodal embedding techniques. Multimodal embedding techniques in illustrative embodiments map various modalities of a given key frame of the received video signal to high-dimensional vectors in a shared vector space.

Multimodal embedding in illustrative embodiments bridges the inherent disparities between different data modalities, including images, audio and text. Multimodal embedding illustratively operates within a shared and expansive concept space. This space acts as a universal bridge that seamlessly connects images, audio and text on a semantic level. It functions by projecting these diverse data modalities into a unified shared vector space. This illustratively involves transforming the different data modalities into high-dimensional vectors within the same shared vector space.

Beyond unification, multimodal embedding aligns these modalities semantically. This alignment supports understanding of core concepts within the data. For example, the concept of "dog" can be conveyed through images, audio or text. The multimodal embedding is illustratively configured to ensure that all these representations converge within the same concept space, facilitating a deeper understanding.

The multimodal embedding also facilitates cross-modal search functionality. For example, illustrative embodiments can seamlessly search for images using natural language text queries. The semantic proximity achieved in the shared vector space makes such intuitive and efficient searches possible.

It is to be appreciated that these and other aspects of multimodal embedding in the disclosed arrangements are presented by way of illustrative example only, and the term "multimodal embedding" as used herein is therefore intended to be broadly construed, so as to encompass these and other arrangements for representing multiple modalities of a received video signal in a shared vector space.

The processing of a given search query in the system 300 will now be described in greater detail. This embodiment utilizes what is also referred to herein as a "lazy search" strategy. Video data, particularly surveillance videos on edge devices, usually have strong correlations between adjacent frames. Rather than examining every single frame within a video stream, the lazy search strategy intelligently targets key frames. These key frames are typically those marked by significant optical flow changes, such as intra-frame coded frames (I-frames) in compressed video formats, or frames detected by preprocessing detection steps. After a text query is processed to identify a relevant key frame, the lazy search strategy accesses its adjacent regular frames from the streaming storage 306, and then performs a localized fine-grained search to derive the final frames as query results.

The lazy search strategy disclosed herein is designed to harness the inherent characteristics of video data, particularly surveillance footage on edge devices. In some embodiments, it results in optimized resource utilization. Video data can be data-intensive, and processing every frame in real-time can place a substantial burden on both storage and computational resources. By focusing exclusively on key frames, illustrative embodiments significantly reduce these resource requirements, making the system more efficient and cost-effective.

Another significant advantage of this strategy is its ability to enhance query precision. When a text query is issued, it is processed to identify a relevant key frame that serves as a reference point. This key frame is known to capture the essence of the query. By retrieving adjacent regular frames from the streaming storage and performing a localized fine-grained search around this key frame, the system ensures that the final query results are highly accurate and relevant to the user's search intent.

In scenarios where real-time video data is continuously streaming, responsiveness is important. The lazy search strategy in the present embodiment allows the system 300 to scale gracefully with the incoming data flow. Its efficient processing of key frames ensures that users receive timely and accurate results, even in dynamic and fast-paced environments.

Accordingly, the lazy search strategy in the present embodiment can optimize resource usage, enhance query precision, and ensure scalability. It also aligns well with the demands of real-time video content search, making the system both efficient and highly responsive to user needs. It is to be appreciated, however, that other search strategies can be applied in other embodiments.

A search query is illustratively received in the video search interface 304 and may comprise, for example, a manual query 320, such as a query that is manually typed or otherwise entered into a web browser by a user on a user device, or an application query 321, such as a query that is automatically generated in accordance with software code of an application running on at least one processing device in the system 300. The search query in this embodiment is assumed to comprise a text-based search query. Other types of search queries can be received by the video search interface 304 in other embodiments. In some embodiments, at least some of the search queries, such as application query 321, are received via API calls. Web services such as chatbots and other types of search interfaces can additionally or alternatively be used in order to enhance user experience.

The received search query is processed in the following manner in the edge computing site, as shown in the figure. An embedding is generated for query text of the search query in query text embedding block 322, utilizing the multimodal embedding engine 305. In key frame search block 324, a key frame search is performed in the key frame vector database 308 utilizing the query text embedding in order to identify at least one key frame that most closely matches the query text embedding. Multiple adjacent frames relative to the at least one key frame are retrieved from the streaming storage 306 in adjacent frames fetch block 326. A fine-grained frame search is performed utilizing the at least one key frame and the plurality of adjacent frames, as indicated in fine-grained frame search block 328.

The fine-grained frame search block 328 illustratively utilizes multimodal understanding facilitated by the multimodal embedding engine 305. For example, in some embodiments, performing the fine-grained frame search further comprises generating multimodal embeddings for respective ones of the plurality of adjacent frames, comparing the multimodal embeddings generated for the respective ones of the adjacent frames to the query text embedding, and identifying at least one frame based at least in part on a result of the comparing. One or more frames identified in the fine-grained frame search are returned as a search result responsive to the search query to the video search interface 304.

In this embodiment, the receiving of the video signal in the streaming storage 306 via the video ingestion interface 302, the extracting of the key frames from the received video signal in key frame detection block 310, and the generating of the multimodal embeddings for respective ones of the extracted key frames in the frame understanding block 312 are illustratively performed by at least one processing device in the edge computing site of system 300 in real-time or near-real-time as the video signal is received in the edge computing site via the video ingestion interface 302. Such an arrangement illustratively supports content search over real-time video with multimodal content understanding, via the video search interface 304 and search components 322, 324, 326 and 328. These and other processing components of the edge computing site, such as components 310 and 312, collectively represent an illustrative example of edge-based video content search logic of the edge computing site of system 300. It should be noted that one or more of the components of system 300 that are described above as being implemented within the edge computing site can in other embodiments be implemented at least in part outside of the edge computing site, such as within a core computing site.

Figure 4:
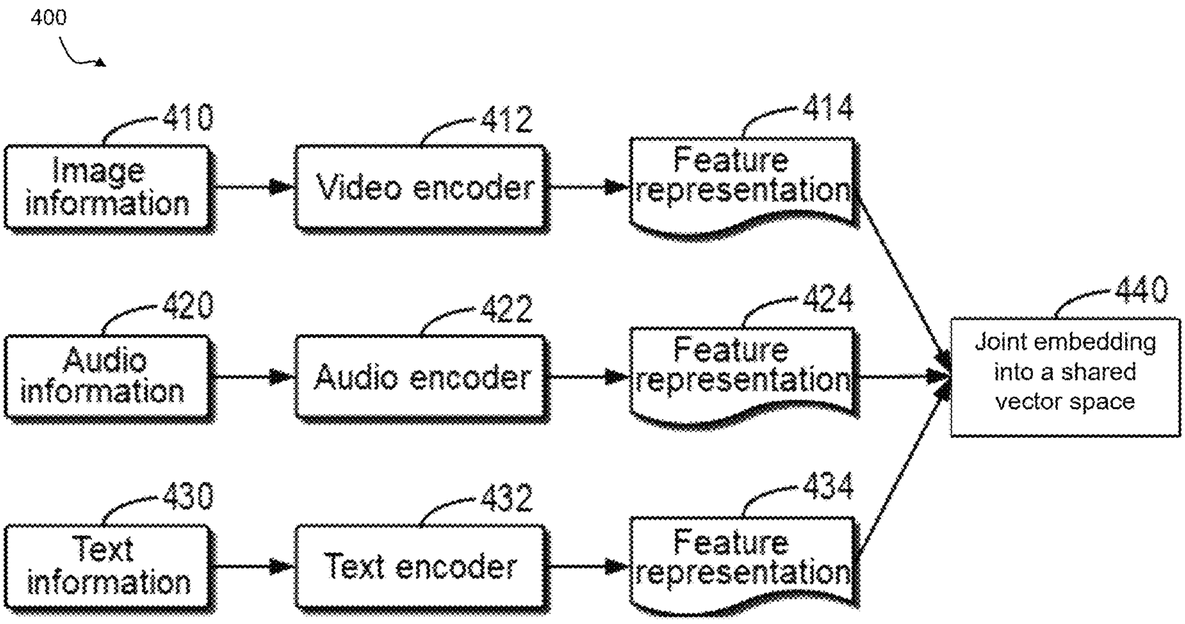
FIG. 4 is a schematic diagram showing an example of a multimodal embedding engine in an illustrative embodiment.

Turning now to FIG. 4, an example implementation of at least a portion of a multimodal embedding engine 400 is shown. In this embodiment, which may represent at least part of the multimodal embedding engine 305, an extracted key frame is processed to obtain therefrom image information 410, audio information 420 and text information 430. Such information represents multiple distinct content modalities of the extracted key frame.

The multimodal embedding engine 400 in this embodiment comprises a video encoder 412 that encodes the image information 410 to generate a corresponding feature representation 414, which illustratively comprises a first keyframe vector characterizing the image information 410. The multimodal embedding engine 400 also comprises an audio encoder 422 that encodes the audio information 420 to generate a corresponding feature representation 424, which illustratively comprises a second keyframe vector characterizing the audio information 420. The multimodal embedding engine 400 further comprises a text encoder 432 that encodes the text information 430 to generate a corresponding feature representation 434, which illustratively comprises a third keyframe vector characterizing the text information 430.

The multimodal embedding engine 400 in this embodiment provides a joint embedding 440 into a shared vector space in which key frame vectors characterizing the image information 410, the audio information 420 and the text information 430 having similar content are close to one another in the shared vector space.

The key frame vectors generated by the multimodal embedding engine 400 for multiple extracted key frames of the received video signal are illustratively stored in a key frame vector database, as previously described.

It should be noted that a wide variety of other types of multimodal embeddings can be used in other embodiments. The multimodal embedding engine 400 of FIG. 4 is just one possible example. In other embodiments, there may be only two modalities present, such as image information 410 and audio information 420, or image information 410 and text information 430. In some embodiments, audio information 420 may be converted to text and processed by the text encoder 432. These and numerous other alternative arrangements will be apparent to those skilled in the art.

Figure 5:
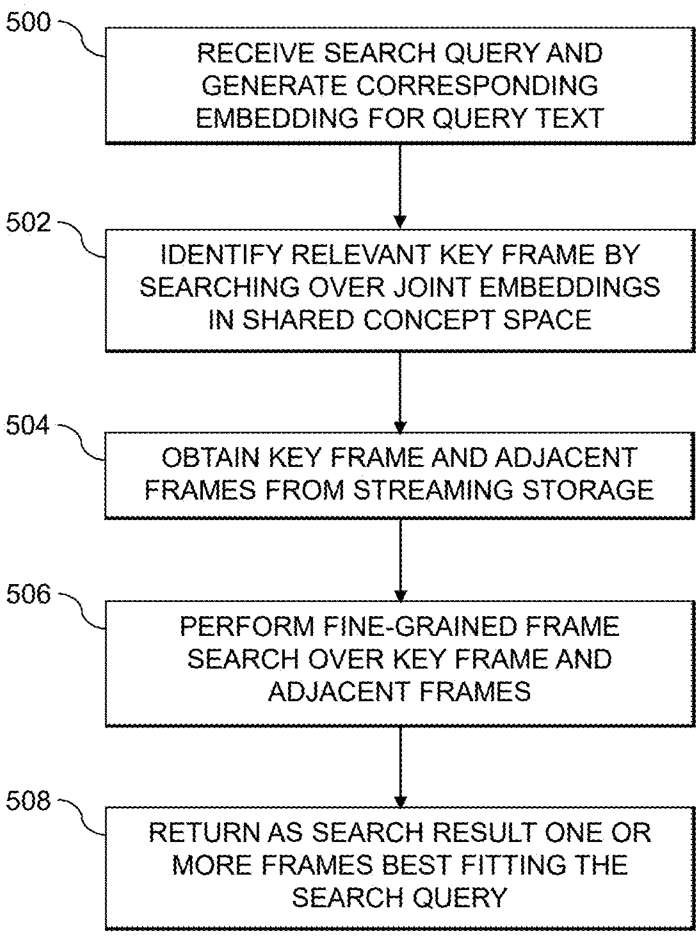
FIG. 5 is a flow diagram showing the processing of an example search query in an illustrative embodiment.

FIG. 5 illustrates the processing of an example search query in an illustrative embodiment. In this embodiment, a process includes steps 500 through 508, which are illustratively performed primarily by edge-based video content search logic of an edge computing site. The steps may be viewed as implementing an algorithm for content search over real-time video with multimodal content understanding.

In step 500, a search query is received and a corresponding embedding is generated using query text of the search query.

In step 502, a relevant key frame is identified by searching over joint embeddings in a shared concept space. The joint embeddings illustratively comprise one or more key frame vectors generated as previously described.

In step 504, the identified key frame and a plurality of adjacent frames are obtained from streaming storage.

In step 506, a fine-grained frame search is performed over the key frame and the adjacent frames, illustratively utilizing respective frame vectors. The frame vectors for the adjacent frames are illustratively generated as needed using a multimodal embedding engine.

In step 508, one or more frames that best fit the search query are returned as a corresponding search result.

Again, the particular processing operations and other system functionality described in conjunction with the flow diagram of FIG. 5 are presented by way of illustrative example only, and should not be construed as limiting the scope of the disclosure in any way. Alternative embodiments can use other types of processing operations involving edge computing sites and functionality for edge-based video content search. Also, functionality such as that described in conjunction with the flow diagram of FIG. 5 can be implemented at least in part in the form of one or more software programs stored in memory and executed by a processor of a processing device such as a computer or server.

As indicated previously, the illustrative embodiments disclosed herein can provide a number of significant advantages relative to conventional arrangements.

For example, some embodiments are advantageously configured to enable users to perform content search over real-time video with multimodal content understanding.

Advantageously, the disclosed techniques in some embodiments achieve highly accurate and efficient video content searching that can be performed substantially in real-time and primarily or entirely at the edge, as video signals are received in an edge computing site from video cameras or other video sources.

The disclosed techniques are computationally lightweight, and eliminate the need for training resource-intensive large language models (LLMs) or other unduly complicated machine learning arrangements. Associated complexities such as data labeling, model training, model validation and other costly and time-consuming aspects of conventional machine learning based approaches are also avoided.

Illustrative embodiments provide enhanced real-time video analytics, suitable for use in a wide variety of different use cases, from manufacturing and retail to security monitoring and product quality control.

The disclosed techniques in some embodiments can adapt quickly to changing business needs, without incurring the significant development costs and elongated project timelines that are typical of conventional approaches. For example, some embodiments can swiftly grasp the essence of video signals as they are collected, liberating users from the arduous prerequisites of data collection, labeling, model training, and the like. This pivotal shift enables users to access real-time insights without being tethered to the burdensome waiting periods and the associated costs of repetitive development cycles.

Some embodiments provide a comprehensive system architecture that ensures that video data is efficiently processed, and that relevant content can be retrieved in real-time using natural language queries.

The disclosed techniques in some embodiments utilize multimodal embedding to project content from various data modalities, such as text, images, and audio, into a shared conceptual space. This allows the different modalities to be interrelated within the same vector space. This cross-modal embedding provides a high degree of flexibility to the disclosed real-time video content search in some embodiments.

Moreover, illustrative embodiments implement a "lazy search" strategy that selectively processes key frames based on the characteristics of video data, rather than processing every video frame. This approach in some embodiments can optimize resource usage, enhance query precision, and ensure scalability. It also aligns well with the demands of real-time video content search, making the system both efficient and highly responsive to user needs.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement hosts and distributed storage systems with dynamic resource adjustment functionality will now be described in greater detail with reference to FIGS. 6 and 7. Although described in the context of system 100, these platforms may also be used to implement at least portions of other information processing systems in other embodiments.

Figure 6:
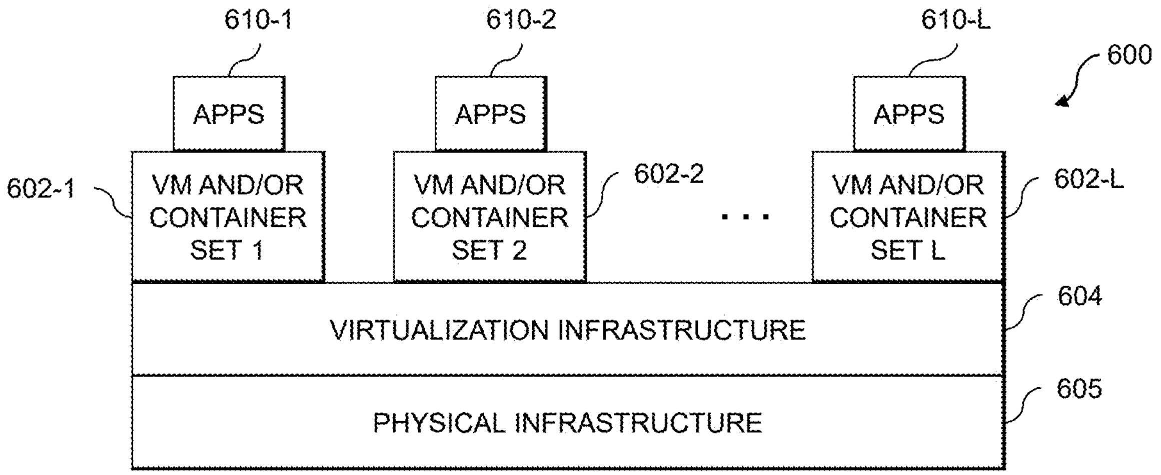
FIGS. 6 and 7 show examples of processing platforms that may be utilized to implement at least a portion of an information processing system in illustrative embodiments.
Figure 7:
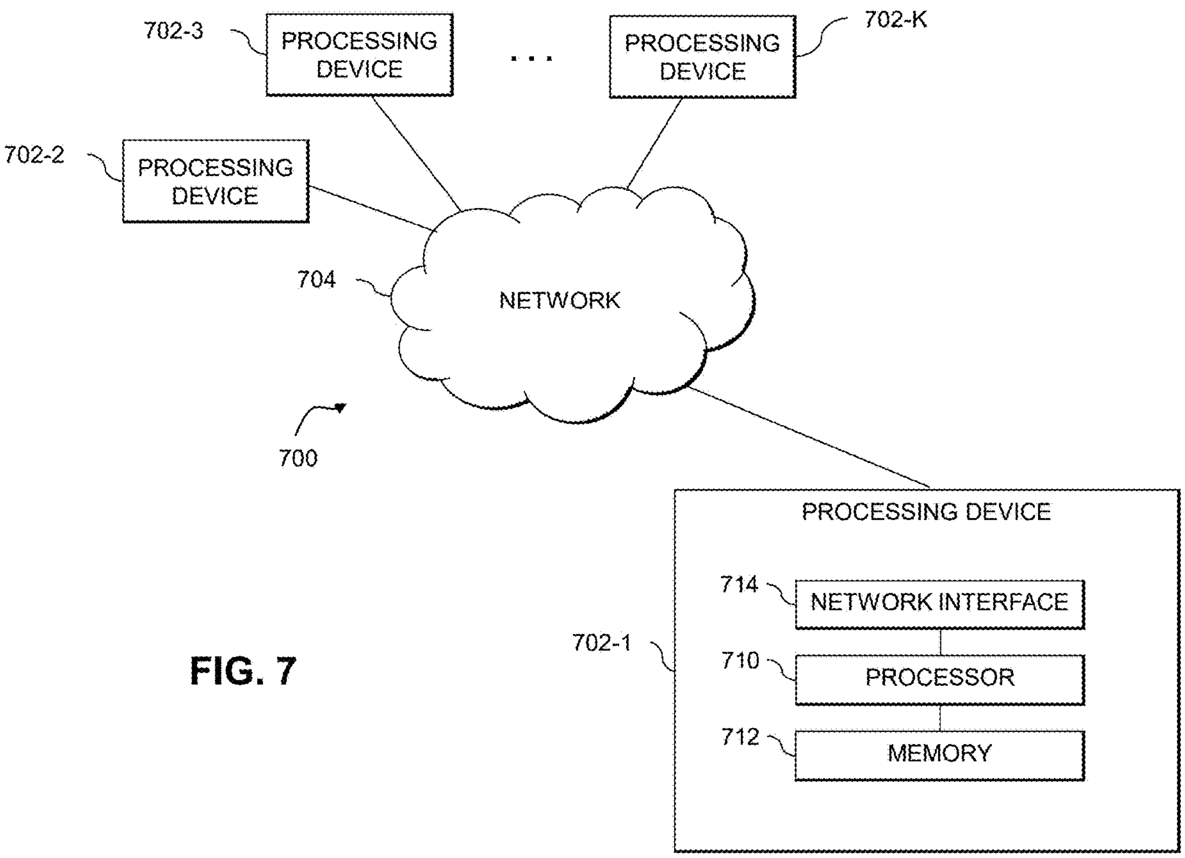

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide functionality for one or more aspects of edge-based video content search of the type disclosed herein using one or more processes running on a given one of the VMs. For example, each of the VMs can include logic instances and/or other components for implementing at least portions of the disclosed edge-based video content search in the system 100.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide functionality for one or more aspects of edge-based video content search of the type disclosed herein. For example, a container host supporting multiple containers of one or more container sets can include logic instances and/or other components for implementing at least portions of the disclosed edge-based video content search in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU), a tensor processing unit (TPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for edge-based video content search as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, processing devices, core computing sites, edge computing sites, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to receive a video signal in an edge computing site of an information processing system configured in accordance with a core-edge architecture;

to extract key frames from the received video signal;

for each of at least a subset of the extracted key frames, to generate a multimodal embedding comprising one or more key frame vectors each characterizing one or more of image information, audio information and text information of the extracted key frame; and to process a search query based at least in part on the key frame vectors;

wherein processing the search query based at least in part on the key frame vectors comprises comparing an embedding generated for query text of the search query to at least a first key frame vector of a first key frame and one or more additional key frame vectors generated for respective ones of a plurality of adjacent frames of the first key frame.

2. The apparatus of claim 1 wherein the edge computing site comprises one or more edge computing devices including the at least one processing device.

3. The apparatus of claim 1 wherein the video signal is received in the edge computing site from one or more video cameras that communicate with the edge computing site over at least one network.

4. The apparatus of claim 1 wherein the information processing system further comprises one or more core computing sites each comprising one or more core computing devices at least a portion of which are implemented at least in part utilizing cloud infrastructure.

5. The apparatus of claim 1 wherein the multimodal embedding provides a joint embedding into a shared vector space in which key frame vectors characterizing image information, audio information and text information having similar content are close to one another in the shared vector space.

6. The apparatus of claim 1 wherein the multimodal embedding generated for a given one of the extracted key frames comprises a first key frame vector characterizing image information of the given extracted keyframe, a second key frame vector characterizing audio information of the given extracted key frame, and a third key frame vector characterizing text information of the given extracted key frame.

7. The apparatus of claim 1 wherein the key frame vectors generated for multiple extracted key frames of the received video signal are stored in a key frame vector database.

8. The apparatus of claim 7 wherein processing the search query based at least in part on the key frame vectors comprises:

generating the embedding for the query text of the search query;

performing a key frame search in the key frame vector database utilizing the query text embedding to identify at least one key frame;

retrieving the plurality of adjacent frames relative to the at least one key frame; and performing a fine-grained frame search utilizing the at least one key frame and the plurality of adjacent frames.

9. The apparatus of claim 8 wherein performing the fine-grained frame search further comprises:

generating multimodal embeddings for respective ones of the plurality of adjacent frames; and comparing the multimodal embeddings generated for the respective ones of the adjacent frames to the query text embedding; and identifying at least one frame based at least in part on a result of the comparing.

10. The apparatus of claim 8 wherein processing the search query based at least in part on the key frame vectors further comprises returning one or more frames identified in the fine-grained frame search as a search result responsive to the search query.

11. The apparatus of claim 1 wherein the receiving of the video signal, the extracting of the key frames from the received video signal, and the generating of the multimodal embeddings for respective ones of the extracted key frames are performed by the at least one processing device in the edge computing site in real-time or near-real-time as the video signal is received in the edge computing site.

12. The apparatus of claim 1 wherein the edge computing site comprises a video ingestion interface configured for receiving the video signal and a video search interface configured to support video content search for the received video signal.

13. The apparatus of claim 12 wherein the edge computing site comprises streaming storage coupled to the video ingestion interface and configured to store raw video data of the received video signal.

14. A computer program product comprising a non-transitory processor-readable storage medium having stored therein program code of one or more software programs, wherein the program code when executed by at least one processing device causes the at least one processing device:

to receive a video signal in an edge computing site of an information processing system configured in accordance with a core-edge architecture;

to extract key frames from the received video signal;

for each of at least a subset of the extracted key frames, to generate a multimodal embedding comprising one or more key frame vectors each characterizing one or more of image information, audio information and text information of the extracted key frame; and to process a search query based at least in part on the key frame vectors;

wherein processing the search query based at least in part on the key frame vectors comprises comparing an embedding generated for query text of the search query to at least a first key frame vector of a first key frame and one or more additional key frame vectors generated for respective ones of a plurality of adjacent frames of the first key frame.

15. The computer program product of claim 14 wherein processing the search query based at least in part on the key frame vectors comprises:

generating the embedding for the query text of the search query;

performing a key frame search in a key frame vector database utilizing the query text embedding to identify at least one key frame;

retrieving the plurality of adjacent frames relative to the at least one key frame; and performing a fine-grained frame search utilizing the at least one key frame and the plurality of adjacent frames.

16. The computer program product of claim 15 wherein performing the fine-grained frame search further comprises:

generating multimodal embeddings for respective ones of the plurality of adjacent frames;

comparing the multimodal embeddings generated for the respective ones of the adjacent frames to the query text embedding;

identifying at least one frame based at least in part on a result of the comparing; and returning the identified at least one frame as a search result responsive to the search query.

17. A method comprising:

receiving a video signal in an edge computing site of an information processing system configured in accordance with a core-edge architecture;

extracting key frames from the received video signal;

for each of at least a subset of the extracted key frames, generating a multimodal embedding comprising one or more key frame vectors each characterizing one or more of image information, audio information and text information of the extracted key frame; and processing a search query based at least in part on the key frame vectors;

wherein processing the search query based at least in part on the key frame vectors comprises comparing an embedding generated for query text of the search query to at least a first key frame vector of a first key frame and one or more additional key frame vectors generated for respective ones of a plurality of adjacent frames of the first key frame; and wherein the method is performed by at least one processing device comprising a processor coupled to a memory.

18. The method of claim 17 wherein processing the search query based at least in part on the key frame vectors comprises:

generating the embedding for the query text of the search query;

performing a key frame search in a key frame vector database utilizing the query text embedding to identify at least one key frame;

retrieving the plurality of adjacent frames relative to the at least one key frame; and performing a fine-grained frame search utilizing the at least one key frame and the plurality of adjacent frames.

19. The method of claim 18 wherein performing the fine-grained frame search further comprises:

generating multimodal embeddings for respective ones of the plurality of adjacent frames;

comparing the multimodal embeddings generated for the respective ones of the adjacent frames to the query text embedding;

identifying at least one frame based at least in part on a result of the comparing; and returning the identified at least one frame as a search result responsive to the search query.

20. The method of claim 17 wherein the multimodal embedding provides a joint embedding into a shared vector space in which key frame vectors characterizing image information, audio information and text information having similar content are close to one another in the shared vector space.

* * * * *